United States Patent [19]

Calvert

[11] Patent Number: 5,233,567
[45] Date of Patent: Aug. 3, 1993

[54] METHOD FOR DETERMINING THE PATH OF A BOREHOLE

[75] Inventor: Rodney W. Calvert, Don Mills, Canada

[73] Assignee: Shell Oil Company, Houston, Tex.

[21] Appl. No.: 560,641

[22] Filed: Jul. 31, 1990

[30] Foreign Application Priority Data

Sep. 8, 1989 [GB] United Kingdom ............... 8920328.5

[51] Int. Cl.[5] .............................................. G01V 1/40
[52] U.S. Cl. ....................................... 367/27; 367/25; 364/422
[58] Field of Search ....................... 367/25, 27, 35, 36, 367/86; 364/422

[56] References Cited

U.S. PATENT DOCUMENTS

| | | | |
|---|---|---|---|
| 3,876,016 | 4/1975 | Stinson | 367/48 |
| 4,003,017 | 1/1977 | Bailey | 367/86 |
| 4,144,949 | 3/1979 | Silverman | 181/106 |
| 4,207,619 | 6/1990 | Klaveness | 367/36 |
| 4,460,059 | 7/1984 | Katz | 181/102 |
| 4,644,335 | 2/1987 | Wen | 340/683 |

FOREIGN PATENT DOCUMENTS

0273722A2 12/1987 European Pat. Off. .

WO88/04435 6/1988 PCT Int'l Appl. .

OTHER PUBLICATIONS

Calvert, R. W.; "Requirements from and for Migration"; 58th Annu. Soc. Expl. Geophys Int. Mtg., Nov. 3, 1988, V-2, pp. 655-656.
Starobinets, A. E.; "Seismic Mapping of Concentrated Diffracting Objects"; Neftegazovaya Geol Geofiz, #2, pp. 41-44, 1982 (Russian).
Sheriff, R. E., "Encyclopedic Dictionary of Exploration Geophysics", 1974, IN 269 S54, p. 141.
Waters, "Reflection Seismology", John Wiley & Sons, Publishers, 1981, pp. 307-341.

Primary Examiner—Nelson Moskowitz

[57] ABSTRACT

A method is provided for determining the path of a borehole relative to a seismic section. The borehole extends through subsurface formation layers which are seismic boundaries and appear as reflectors in a seismic section. The method comprises generating seismic waves, measuring travel times of said seismic waves between a plurality of surface points and at least one point in said borehole, for which the determination of its position is required, deriving at least one diffraction curve or surface from said travel times, and then mapping said curve or surface upon said seismic section.

7 Claims, 3 Drawing Sheets

METHOD FOR DETERMINING THE PATH OF A BOREHOLE

BACKGROUND OF THE INVENTION

The present invention relates to a method for determining the path of a borehole, and more specifically to determining the position of a well borehole relative to data from a seismic survey.

More particularly, the present invention relates to a method for determining the path of a borehole which extends through subsurface formation layers; these formation layers may also be seismic boundaries and appear as reflectors in a processed seismic section (which section results from a seismic survey). As used herein, the term "seismic section" means the processed results of a seismic survey.

Usually a well path is planned based upon the position of seismic boundaries seen on a seismic section. Thus, when a borehole is drilled to reach a subsurface region for production purposes, it is of great interest to monitor the path of the borehole through said section before reaching said region. In particular, it could be necessary to correct the path by appropriately adjusting drilling conditions.

It is known from U.S. Pat. No. 2,062,151 to make subsurface determinations of the bottom of a borehole with reference to the position of the mouth of the borehole at the earth's surface. For example, the bottom position of said borehole and the seismic wave velocity are determined by solving a set of equations in accordance with a set of parameters to be determined and from travel time measurements. However, only surface related position coordinates are obtained.

From International Patent Application No. WO 88/04435 it is known to use seismic waves that originate from a drill bit while drilling; these seismic waves are received by sensors near the earth's surface, coming either directly from the drill bit or after reflection from seismic boundaries. In this manner, geological formations being drilled are also imaged. However, to process the wave data so obtained, transfer functions have to be employed; these transfer functions represent different formation conditions and may be implemented in electronic circuitry, for example, electronic filter means.

These and other limitations and disadvantages of the prior art are overcome by the present invention, however, and improved methods are provided for determining the path of a borehole relative to a seismic section.

SUMMARY OF THE INVENTION

In a preferred embodiment of the present invention, methods are provided for determining the path of a borehole relative to a seismic section. The preferred method of the present invention for determining the path of a borehole extending through subsurface formation layers, which layers are also seismic boundaries and appear as reflectors in a seismic section resulting from data from a seismic survey, comprises the steps of generating seismic waves, measuring travel times of seismic waves between a plurality of surface points and at least one point in said borehole for which the determination of its position is required, deriving from said travel times at least one diffraction curve or surface, and mapping said curve or surface in register upon said seismic section of said subsurface formation layers. Preferably, the seismic section is obtained from seismic data that is at least stacked.

In a further step tangency points of said curves or surfaces and said reflectors are determined enabling a correction of the path of said borehole being drilled.

In an alternative method said diffraction curve and said seismic reflection survey data are further processed by means of the same seismic data processing procedure thereby obtaining the same seismic coordinates.

Advantageously the above method permits a quick determination of the path of a borehole, for example of a borehole being drilled in order to strike an oil reservoir. In particular, a seismic data processing procedure can be chosen without necessitating accurate subsurface parameter values, such as velocity profiles.

Thus, it is an object of the present invention to determine the path of a borehole extending through subsurface formation layers when such layers have already been surveyed seismically.

It is another object of the present invention to determine the path of a borehole on a seismic section relative to subsurface formation layers, i.e. with respect to the seismic coordinates of the layers on the seismic section.

It is still another object of the present invention to provide a method for measuring the well borehole position in seismic coordinates as a well is drilled.

These and other objects and advantages of the present invention will become apparent from the following detailed description, wherein reference is made to the accompanying drawings.

DETAILED DESCRIPTION OF THE DRAWINGS

DETAILED DESCRIPTION

Figure 1:
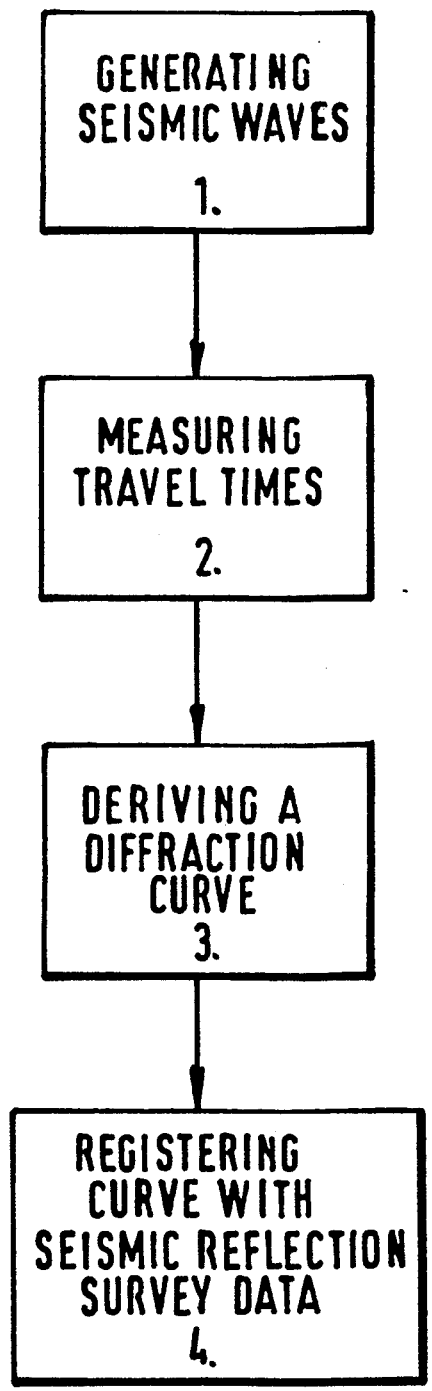
FIG. 1 shows a simplified block diagram representing the basic steps of the preferred method of the present invention.

The present invention provides methods for determining the path of a borehole in the earth relative to a seismic section. Referring now to FIG. 1 a simplified block diagram of the basic steps of the preferred method for determining the path of a borehole in accordance with the invention is depicted.

In block 1 the first step of generating seismic waves is depicted. Such seismic waves, when generated by seismic generator means near the earth's surface and detected by seismic receiver means arranged within a borehole, are called well shoots, However, the reverse configuration, with a source down in the borehole and detectors on or near the surface of the earth, is also possible.

The next step depicted in a block 2, comprises measuring the travel times of the above-mentioned seismic waves which arrive at the receiver means after travelling through formation layers between said generator means and said receiver means.

Those skilled in the art will appreciate that in most cases pressure (or P-, or longitudinal) waves (instead of shear (or SH-, or transversal) waves) are generated and detected. Although any type of seismic waves may be employed in the methods of the present invention. The properties of such types of waves are known and will not be described in any further detail.

It should be noted that the seismic generator means and/or receiver means can be arranged in such a way that not only a cross-section of the subsurface formation will be surveyed but even a volume of the formation may be surveyed; these types of surveys are often referred to as 2D- and 3D-seismic investigations, respectively (with D referring to "dimension").

Since each travel time is related to a surface coordinate or surface position corresponding to the generator and receiver positions, as noted above, the surface positions and measured travel times can be plotted to obtain a graph of positions, x, versus times, t. In FIG. 1 a seismic processing procedure is depicted by block 3. Generally a curve (a so-called diffraction curve) or a surface is derived, (respectively, a curve for the 2D- case and a surface for the 3D-case), from said plots after processing. For reasons of clarity the figures only depict 2D-representations; such 2D-representations result either from actual 2D-investigations, or from a cross-sectional view through 3D-investigations.

Seismic sections resulting from previous investigations of the subsurface formation layers are often available before drilling. Such sections are the results of acquiring and processing seismic data. These seismic sections may be presented as x vs. t-graphs or in other formats. Furthermore, it will be appreciated by those skilled in the art that these are possible differences in travel time definitions that have to be taken into account. More particularly, two-way-times are used for the seismic section and one-way-times are used for the well shoot data. In addition, to get a clear seismic section, the data from the seismic survey has to be processed at least by means of a conventional basic seismic processing procedure, i.e. a stacking procedure; stacking procedures are data sorting and reduction methods, and as such are known to those skilled in the art and will not be explained in any further detail.

In accordance with the methods of the invention, the next step, depicted as block 4 in FIG. 1, the x vs. t-graph for a curve (or even a surface) is mapped in register upon such a section. Advantageously, the position of at least one point within a borehole represented by one such curve (or surface) can be traced immediately, which is the result of using the same seismic coordinates, i.e. x and t.

Referring now to FIGS. 2 to 5 an example of the above method, which has been applied to a simulated or synthetic seismic section, will be shown. In the graphs of the FIGS. 2 to 5 similar references are used for both corresponding horizontal and vertical axes and layer interfaces.

Figure 2:
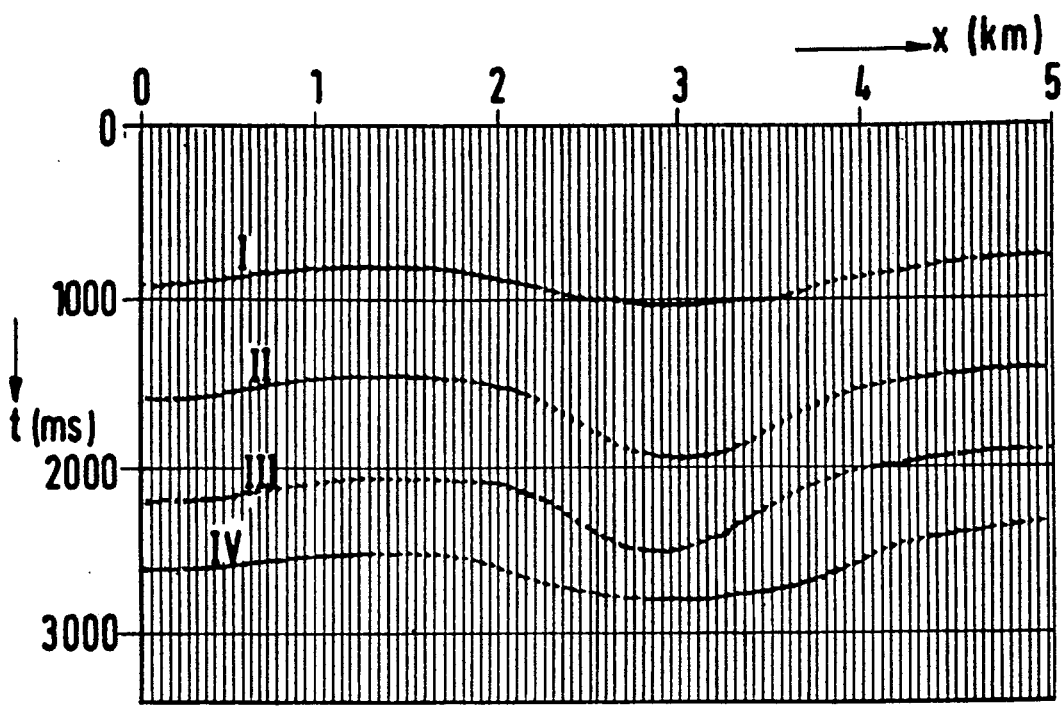
FIG. 2 depicts a synthetic seismic section for a set of subsurface formation layers obtained by processing synthetic seismic data using a known seismic processing procedure.

Referring now to FIG. 2, a simulated seismic section of a set of subsurface formation layers is shown. Along the horizontal axis of said plot, surface position coordinates, x, in kilometers are used, whereas the vertical axis of the plot represents time, t, in milliseconds.

For ease of description an artificial example of a geological subsurface formation having only four layer interfaces (I to IV), with these interfaces being seismic boundaries and appearing as reflectors in said seismic section, is shown. For those skilled in the art it will be clear that the seismic section as shown can be obtained in many ways. For example, seismic waves, produced by any suitable seismic source near the earth's surface, are reflected at the respective subsurface layer interfaces, and will be detected by means of seismic receivers also arranged near the earth's surface. In this example, the seismic section of FIG. 2 is shown after applying seismic data processing procedures to the data. Advantageously, time migration and subsequent stacking are employed. In particular, the so-called Kirchholl migration followed by normal moveout (NMO) stacking have been used. Both Kirchholl migration and NMO stacking, as such, are known to those skilled in the art and will not be explained in any further detail. Other forms of migration including depth migration may also be used in the methods of the present invention.

In such a seismic representation of a subsurface formation only a relative mapping of the geological formation is obtained. Although effective velocity values are applied, no real depth conversion is accomplished, since velocity is used as a mathematical parameter in the migration procedure and is only a rough approximation of the real velocities.

Figure 3:
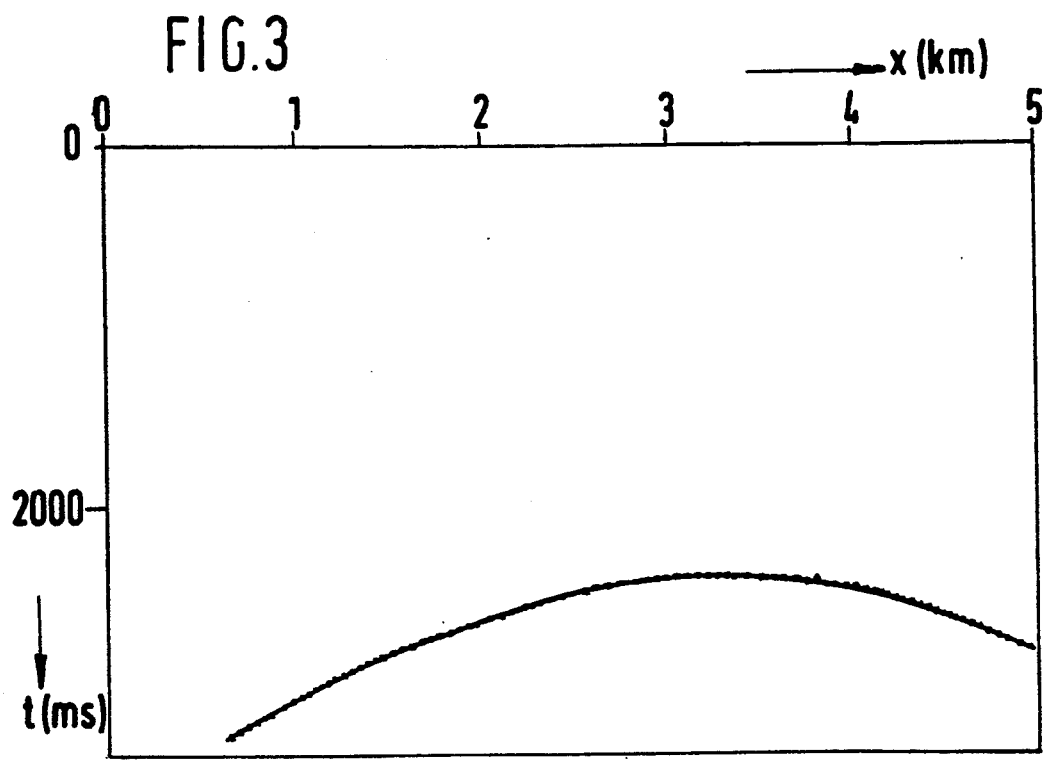
FIG. 3 is a graph of a curve derived from data originating from simulated well shoots to a point in a borehole extending through the subsurface layers of FIG. 2.

In FIG. 3 a plot of a curve is shown composed from simulated well shoots to a point within a borehole which extends through the subsurface layers.

In FIG. 3, the same x-coordinates are used along the horizontal axis as in FIG. 2. In the vertical direction, time values (in millisecond) originating from travel times of seismic waves beginning in different positions at the earth's surface and detected at a point in the borehole are shown, resulting in a hyperbola-like curve, known as a so-called diffraction curve. Generally, for such a curve, the shape can be explained as follows; the travel time between the point within the borehole and a point just above that point at the surface is the shortest travel time while the other travel times will be longer depending on their surface position. Furthermore, it can be mathematically proven that the curve is is an exact hyperbola in the case of a seismically homogeneous medium, i.e. ($p \times v$) is a constant, where $p$ is the density of a layer and v is the seismic propagation velocity of that layer.

As can be seen in FIG. 3, the curve is not an exact hyperbola which results from assumed inhomogenities in the subsurface formations.

As previously explained, such a curve will be obtained also when seismic waves originate from a point-like source within said borehole, for example from a drill bit used as a seismic source.

Figure 4:
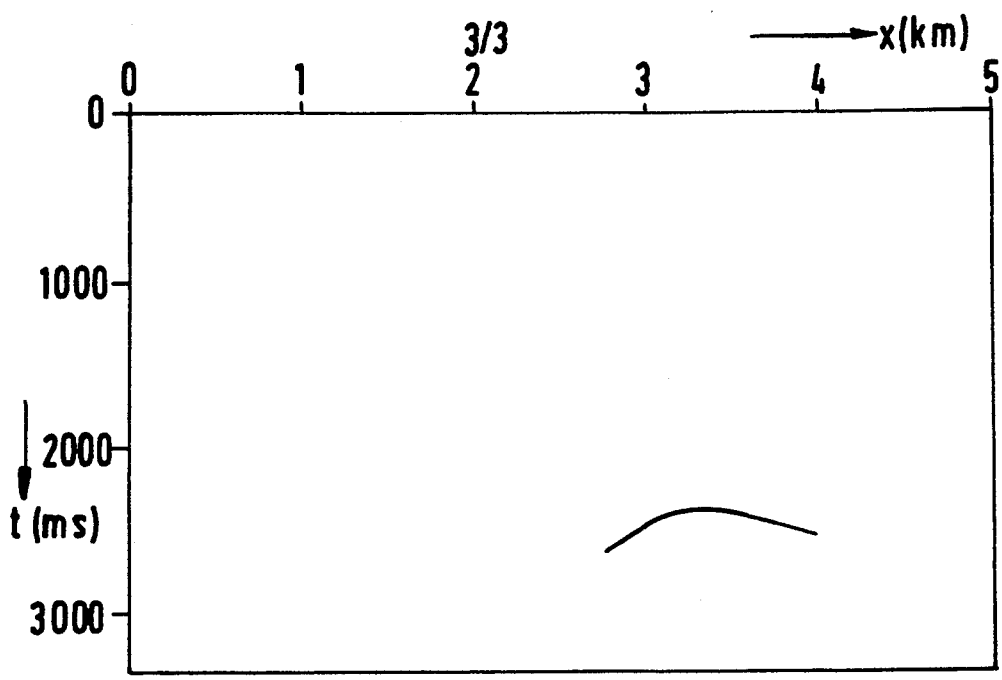
FIG. 4 depicts the curve of FIG. 3 after processing by means of the same seismic processing procedure used to obtain the seismic section of FIG. 2.

Referring now to FIG. 4, the above curve of FIG. 3 is depicted as processed using same seismic data processing procedures as used to obtain FIG. 2, i.e. the Kirchhoff migration as described with respect to the seismic section of FIG. 2. As can clearly be seen, the same axes and units are used. Thus, the same seismic coordinates are used for both figures.

Since the curve as shown in FIG. 3 results from a point like diffractor, i.e. a point within the borehole, a point could be expected after applying the above noted migration procedure. However, since only effective velocity values are employed, generally, a point will be smeared out along an hyperbola-like curve having the turning point, either upwardly or downwardly, dependent on the effective velocity values. This effect is called, respectively, undermigration and overmigration.

Figure 5:
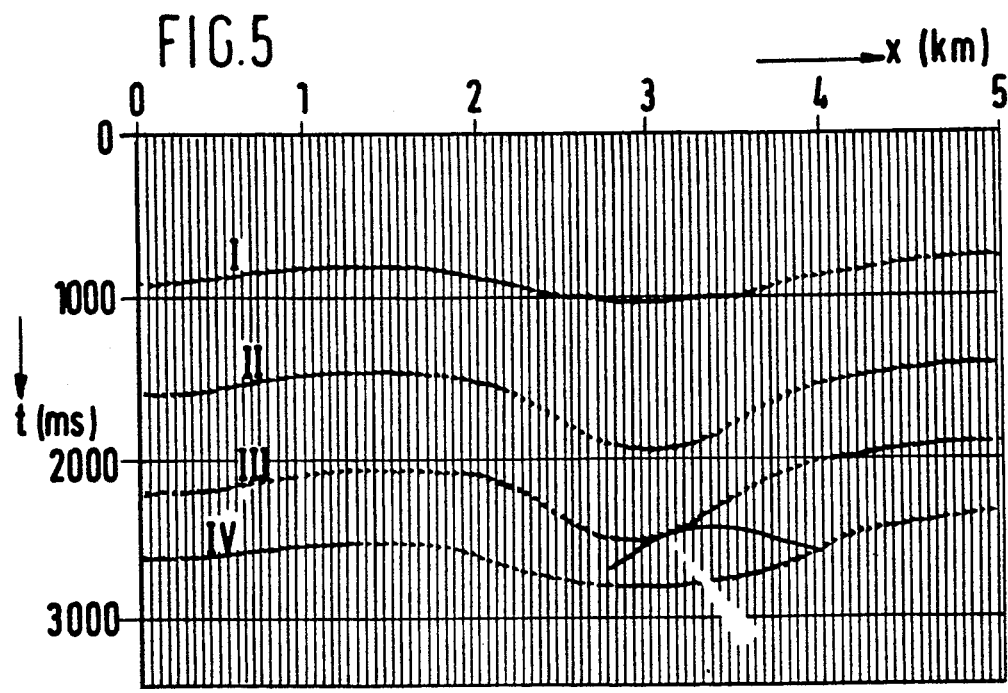
FIG. 5 is the same section shown in FIG. 2 upon which the curve processed as shown in FIG. 4 has been mapped.

In FIG. 5 the results of the present invention are illustrated. It is clear that FIG. 5 is a direct combination of FIG. 2 and FIG. 4, i.e. the curve of FIG. 4 has been mapped (registered) upon the seismic section of FIG. 2. Furthermore, it should be noted that for some types of migration, e.g. the Kirchhoff migration used here, advantageously the mapping of the diffraction curve can be carried out quickly by means of computations on the picked travel times.

Now, without determining the exact position in, for example, surface related coordinates like Cartesian or polar coordinates, the path of the position of the above point within a borehole can be determined simply by using said plot, as will be explained hereafter.

For those skilled in the art it will be clear that parts of subsurface layer interfaces acting as reflectors (as shown in FIG. 2) on non-migrated data result as envelopes of diffraction curves (or impulse responses) from the layer interfaces. Thus the diffraction curves are tangent to their corresponding reflectors. This tangency property is retained even after applying a migration procedure.

Consequently the determination of the tangency point of the migrated diffraction curve from the point in the borehole and one of the seismic boundaries I to IV, as shown in FIG. 5, will give the exact position of the point within the borehole, presented in seismic coordinates. Such a tangency point is shown in FIG. 5 and is indicated by the arrow.

Thus, a method for the determination of subsurface points, for example within a borehole, is obtained. This method is a simple procedure that permits a quick and exact indication of the unknown position relative to the processed seismic section.

Furthermore, when a borehole is drilled, drill bit waves can be used and drilling directions could be corrected enabling fast and economic striking of targets such as oil reservoirs. In a similar manner recognized drilling hazards may be avoided.

A particular advantage of the technique results if the seismic survey has been processed using a migration technique with an operator which may be represented by a simple analytic expression. In these cases the travel times of the diffraction curves can be migrated quickly and easily by a hand-held calculator, even in the field.

As already has been noted, many different types of stacking and migration procedures can be used, as will be known to those skilled in the art, in the methods of the present invention. Further, a migration procedure can be applied before or after a stacking procedure, depending upon the patterns as recorded and the velocities or velocity profiles to be employed.

Many other modifications and variations may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the invention.

What is claimed is:

1. A method for determining the path of a borehole extending through subsurface formation layers using at least one seismic section, the seismic section being obtained by processing a seismic survey, comprising:
   providing the seismic section, said seismic section having at least reflectors corresponding to portions of said subsurface formation layers displayed on the seismic section in seismic coordinates,
   generating seismic waves,
   measuring travel times of said seismic waves between a plurality of surface points and at least one point in said borehole for which the determination of its position is required,
   deriving from said travel times at least one diffraction curve or surface, and mapping said curve or surface upon said seismic section.

2. The method as claimed in claim 1, further comprising, determining tangency points of said curve or surface and said reflector.

3. The method as claimed in claim 2, further comprising, correcting the path of said borehole, said borehole being drilled through said layers.

4. The method as claimed in claim 1, wherein said diffraction curve or surface and said seismic section are processed by means of the same seismic data processing procedure to obtain the same seismic coordinates.

5. The method as claimed in claim 4, wherein said seismic data processing procedure is a migration procedure.

6. The method as claimed in claim 5, wherein said migration procedure is a time migration procedure.

7. The method as claimed in claim 5, wherein said migration procedure is a depth migration.

* * * * *